Nov. 18, 1969     F. H. SWAIM     3,479,476

ACCELERATION RESPONSIVE ELECTRICAL SWITCH

Filed Sept. 7, 1967

INVENTOR
Frank H. Swaim

BY

ATTORNEY

United States Patent Office 3,479,476
Patented Nov. 18, 1969

3,479,476
ACCELERATION RESPONSIVE ELECTRICAL SWITCH
Frank H. Swaim, Silver Spring, Md., assignor to the United States of America as represented by the Secretary of the Navy
Filed Sept. 7, 1967, Ser. No. 666,562
Int. Cl. H01h 35/14
U.S. Cl. 200—61.45
10 Claims

ABSTRACT OF THE DISCLOSURE

An acceleration actuated inertia switch having a spring biased acceleration sensing member slideably mounted in a switch body. Diametrically opposed grooves in the sensing member hold a pair of metal balls. Acceleration of the switch causes the sensing member to slide axially in the switch body and causes the metal balls to make electrical contact between two opposed sets of radially aligned, axially spaced contacts in the switch body wall and a set of axially spaced conductors through the sensing member.

BACKGROUND OF THE INVENTION

This invention generally relates to inertia operated devices and more particularly to an inertia-type electrical switch.

During the flight of rockets and projectiles it is necessary to provide certain switching functions for the completion or breaking of various electrical circuits. Various forms of inertia operated switches which are responsive to acceleration and/or deceleration are known to the prior art, but none of the prior art switches have been found to be completely reliable.

One usual form of inertia operated switch known to the prior art comprises an acceleration sensing element having mounted thereon a number of knife-blade switch contacts which under acceleration forces experiences a longitudinal movement. As the projectile accelerates the sensing element moves through a distance which corresponds to the magnitude of the acceleration forces experienced. During movement of the sensing element the knife-blade contacts are dragged through a series of double spring leaf electrical contacts, breaking and making electrical continuity. The frictional drag created by the interaction of the knife blade and spring leaf contacts consumes energy from the sensing element. Since the acceleration forces are essentially constant during missile flight the sensing element must, by necessity, be sufficiently massive to generate forces capable of making and breaking all of the electrical contacts. Therefore, as the number of contacts increases so must the mass of the sensing element. This technique of switching creates an undesirable and costly weight problem for inertia sensing devices. The spring leaf contacts are severely critical during high frequency vibration during flight. Some contacts have been known to open and remain open during flight to high frequency vibration.

SUMMARY OF THE INVENTION

It is therefore an object of the present invention to provide an improved inertia-type switch which expends only a minimal amount of energy in performing the switching functions.

A further object of the present invention is to provide an improved inertia-type switch wherein at least one of the switching functions is dependent upon a fail-safe characteristic of the switch.

A still further object of the present invention is to provide a falling ball inertia-type switch wherein the rate of travel of the falling ball is completely independent of the rate of travel of the sensing element.

Another object of the present invention is the incorporation of a fail-safe system within an inertia-type switch which is capable of performing a multiplicity of sequential switching functions.

A still further object of the present invention is to provide an improved inertia-type switch wherein the mass of the sensing element is independent of the number of switching functions incorporated in the switch.

The foregoing and other objects are attained by an inertia-type electrical switch which in response to acceleration and/or deceleration forces completes various electrical switching functions with a minimum expenditure of energy. By utilizing a falling ball technique to effect the opening and closing of the various electrical contacts, the inertial forces can be completely utilized for moving the sensing element of the switch mechanism without undesirable expenditure of energy to effect the switching operations themselves. The force sensing element is spring biased such that the rate of movement of the sensing element is dependent upon the external force applied to the sensing element and the force applied by the biasing means. The rate of travel of the conductive balls is solely dependent upon the acceleration forces experienced by the balls, and the conductive balls will travel at a rate greater than the spring biased sensing element under normal conditions. Should a mechanical failure occur in the switching device itself, the sensing element will travel at the same rate as the balls. By making the path the balls must follow longer than the path the sensing element follows, the sensing element will block the last set of contacts and thus prevent the conductive balls from completing the final circuit, thus incorporating a fail-safe system within the switch.

DESCRIPTION OF THE PREFERRED EMBODIMENT

Figure 1:
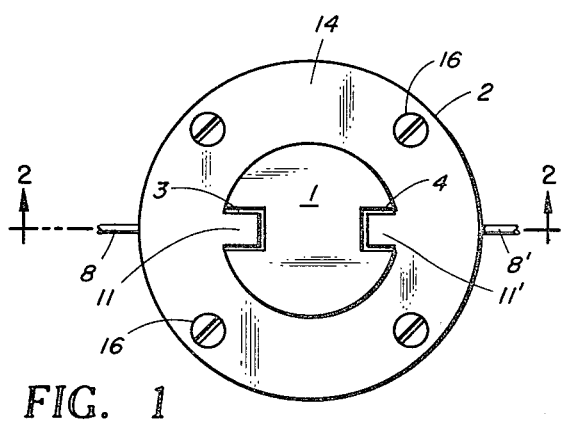
FIG. 1 is a top plane view of the inertia-type electrical switch.
Figure 2:
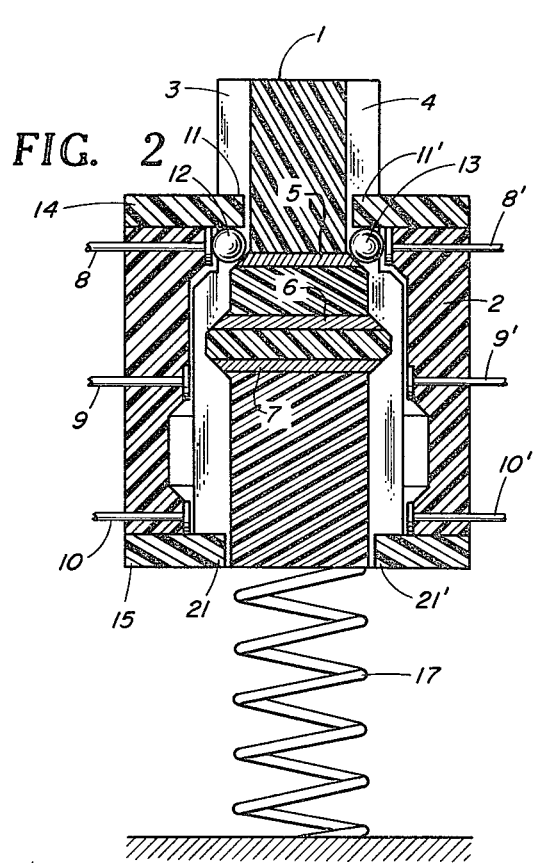
FIG. 2 is a sectional view taken substantially along line 2—2 of FIG. 1 showing the sensing element and conductive balls completing a first electrical circuit path.

Referring now to the drawings wherein like reference numerals are used to designate the same parts in the several views, and more particularly to FIGS. 1 and 2, the electrical switch is shown as having an insulated cylindrical shaped sensing member 1 slidingly mounted within an insulated tubular housing member 2. The sensing element 1 has two grooves 3 and 4 formed diametrically along the longitudinal extent thereof. The grooves 3 and 4 are irregular in shape for reasons more fully explained hereinafter. For illustrative purposes, the switch will be considered as mounted within an aerial vehicle such as a missile. Located centrally of the sensing element 1 and in exposed relationship with the grooves 3 and 4 are axially spaced electrical feedthrough circular canted surface contacts 5, 6 and 7. Disposed within the insulated wall of housing 2 are two sets of radially aligned axially spaced electrical contacts 8, 9 and 10 and 8' 9' and 10'. Electrically conductive masses or bodies such as balls 12 and 13 are positioned in grooves 3 and 4, respectively. The balls 12 and 13 are encapsulated within grooves 3 and 4 by circular cover plates 14 and 15 which are secured to the housing 2 by conventional means such as screws 16. The cover plate 14 has inwardly protruding tongues 11 and 11' which fit within the grooves 3 and 4, respectively, to guide the sensing element 1. Corresponding tongues 21 and 21' are located on cover plate 15.

As more clearly shown in FIG. 2, the sensing element 1 is held in place by a conventional movement retarding or biasing element such as coil spring 17 in engagement with one extremity thereof in the absense of any external force. In this initial position the balls 12 and 13 are held against the respective contacts 8 and 8' by the canted surface of feedthrough contact 5. In this manner an electrical circuit path is formed through contact 8, ball 12, feed through 5, ball 13 and contact 8', forming a prelaunch electrical circuit prior to the sensing element 1 experiencing any external force.

Figure 3:
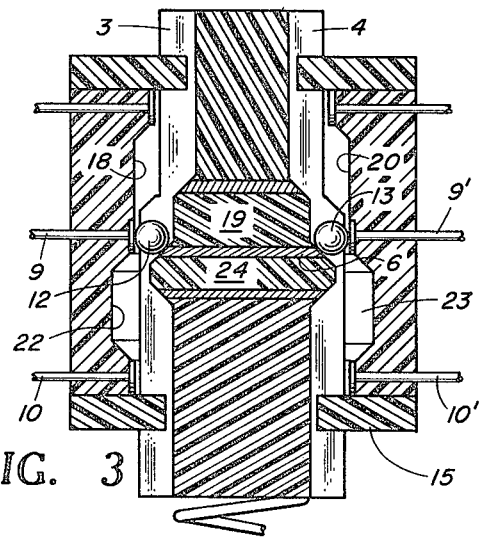
FIG. 3 is a sectional view of the inertia-type electrical switch showing the sensing element and conductive balls completing a second electrical circuit path.

As the sensing element 1 experiences an inertial force such as that resulting from the acceleration of the carrying missile, the sensing element will urge against spring 17. As the sensing element 1 begins to move the balls 12 and 13, each of which is also experiencing an acceleration force, will be released from the position shown in FIG. 2 and will attempt to fall toward the position shown in FIG. 3. Ball 12 will fall within the groove 3 into that portion defined by the internal wall portion 18 of housing 2 and cylindrical portion 19 of sensing element 1, and ball 13 will fall into that portion of groove 4 defined by internal wall 20 of housing 2 and cylindrical portion 19 of sensing element 1. As the sensing element 1 further moves against the spring 17, the balls 12 and 13 will eventually come into contact with electrical contacts 9 and 9' as shown in FIG. 3. Thus, in this second position the first electrical circuit path is open and a second electrical path formed through contact 9, ball 12, feedthrough 6, ball 13 and contact 9'.

Figure 4:
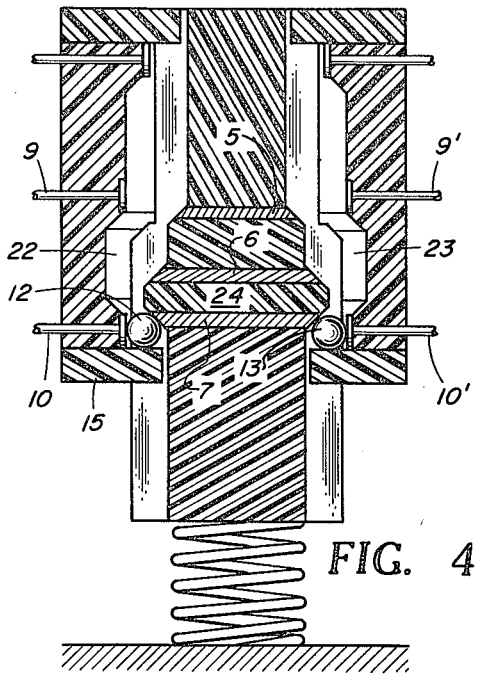
FIG. 4 is a sectional view of the inertia-type electrical switch showing the sensing element and conductive balls completing a third electrical circuit path.

As the missile continues accelerating in flight the sensing element 1 further urges against spring 17 and progresses downwardly releasing balls 12 and 13 from the position shown in FIG. 3 such that the balls move to the position shown in FIG. 4 due to the acceleration forces experienced by the balls. Since the sensing element 1 is moving at a rate dependent upon the acceleration force experienced and the force exerted by the biasing means 17, whereas the balls 12 and 13 move at a rate solely dependent upon the acceleration forces, the balls 12 and 13 under normal conditions will be moving at a much greater rate than the sensing element. As the balls are released from the position shown in FIG. 3, the ball 12 falls into cavity 22 in housing 2 and ball 13 falls into cavity 23. The balls will continue falling at a rapid rate until they come into contact with tongues 21 and 21' of cover plate 15 and their respective contacts 10 and 10'. As the sensing element 1 continues to urge against spring 17, it will come to rest in a final position wherein a third electrical circuit path is formed through contact 10, ball 12, feedthrough 7, ball 13 and contact 10'.

Should a mechanical failure occur in the switch, such as spring 17 breaking, the rate of fall of sensing element 1 and the balls 12 and 13 will be the same. Since the sensing element 1 and the balls 12 and 13 will be falling at the same rate from the position shown in FIG. 3 to the position shown in FIG. 4, the balls 12 and 13 will remain above cylindrical portion 24. The cylindrical portion 24 will come into contact with cover plate 15 and thus block the balls 12 and 13 from coming into contact with electrical contacts 10 and 10' to complete the electrical path therethrough. Therefore, a fail-safe system is incorporated into the switch should a mechanical failure occur such that the circuit path shown in FIG. 4 cannot be completed.

It is clear that by making the switch longer and providing additional contours within the grooves 3 and 4 a larger number of electrical circuit paths may be provided within the longitudinal extent of the switch. Furthermore, by providing additional grooves around the sensing element 1 parallel to the grooves 3 and 4, additional conductive balls and electrical conductors may be provided to give the switch the capability of additional switching functions.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An acceleration force responsive electrical switch comprising:
   a first insulated member having at least first and second axially spaced electrical contact means thereon,
   a second insulated member movable relative to said first insulated member and having at least first and second axially spaced electrical contact means thereon,
   said electrical contact means on said second insulated member being spaced from said electrical contact means on said first insulated member,
   movable electrically conductive mass means between said first insulated member and said second insulated member,
   one of said insulated members being moveable relative to the other of said insulated members in response to an external force from a first position wherein said first electrical contact means of said insulated member are in a spaced adjacent relationship, to a second position wherein said second electrical contact means of said insulated members are in spaced adjacent relationship,
   said first electrical contact means of said first insulated member forming an electrical circuit path with said first electrical contact means of said second insulated member through said electrical conductive mass means when in said first position,
   said second electrical contact means of said first insulated member forming an electrical circuit path with said second electrical contact means of said second insulated member through said electrically conductive mass means when in said second position,
   means for regulating the rate of movement of said one of said insulated members, and
   means providing for movement of said electrically conductive mass means from said first position to said second position at a rate independent of the rate of movement of said one of said insulated members.

2. The switch of claim 1 wherein said first insulated member has a third electrical contact means axially spaced from said first and second electrical contact means thereon, said second insulated member has a third electrical contact menas axially spaced from said first and second electrical contact means thereon,
   sand second insulated member being axially moveable in response to an external force from said second position to a third position wherein said third electrical contact means are in spaced adjacent relationship,
   said third electrical contact means of said first insulated member forming an electrical circuit path with said third electrical contact means of said second insulated member through said electrically conductive mass means when in said third position, and
   means providing for movement of said electrically conductive mass means from said second position to said third position at a rate independent of the rate of movement of said second insulated member.

3. The switch of claim 1 wherein:
   said rate of movement regulating means comprises biasing means connected to said second insulated member for governing the rate of movement of said second insulated member when an external force is exerted thereon.

4. The switch of claim 1 wherein said electrical contact means on said second insulated member extend completely therethrough,
   said first insulated member extends around at least a radial portion of said second insulated member and said electrical contact means on said first insulated member has at least two sets of electrical contacts equal in number to and in alignment with said first and second electrical contact means on said second insulated member,
   and said electrically conductive mass means comprises two movable metal bodies for completing successive electrical circuits between said electrical contact means on said second insulated member and said two sets of electrical contacts on said first insulated member.

5. The switch of claim 4 wherein said first insulated member is a hollow cylindrical member housing said second insulated member and said conductive mass means.

6. The switch of claim 4 wherein the said means providing for movement of said mass means comprises at least two longitudinal grooves in one of said insulated members, a respective one of each holding a respective one of said metal bodies.

7. The switch of claim 6 further comprising means for preventing said metal bodies from completing said electrical circuit in said second position, including means defining a path of travel for said metal bodies that is longer than the path of travel of said second insulated member.

8. The switch of claim 1 wherein said means providing for movement of said mass means comprises a longitudinal groove in one of said insulated members for holding said mass means.

9. The switch of claim 6 further comprising means for preventing said electrically conductive mass means from completing said electrical circuit in said second position, including means defining a path of travel for said mass means that is longer than the path of travel of said second insulated member.

10. An acceleration actuated inertia switch comprising:
   a hollow housing member having an internal surface,
   a sensing member mounted in said housing and having an external surface,
   one of said members being mounted for longitudinal movement relative to the other of said members,
   movement retarding means operatively connected to said one of said members to retard the movement thereof,
   means formed in at least one of said surfaces of said members defining two longitudinal grooves both having sides and a bottom,
   said groove bottoms and the facing surface of the other of said member defining two walls of a pair of passages,
   two electrically conductive bodies movably confined within said passages, a respective one of each in a respective one of each of said passages,
   one wall of both of said passages comprising at least one restricting means projecting into said passage whereby the effective dimensions of said passage is reduced,
   the other wall of both of said passages comprising at least one enlarging means whereby the effective dimensions of said passage is enlarged,
   both of said members having electrical contact means communicating with both of said passages, at least one of said contacts being located at both of said passage restricting means,
   whereby under acceleration the inertia of said one of said members will cause the movement thereof relative to the other of said members against said movement retarding means, said bodies will move under the influence of their inertia through said passage until they reach said passage restricting means where they will make electrical contact with said one of said electrical contact means, further movement of said one of said members will align said one of said contact means with another of said contact means in said other wall of said passage and said bodies will complete electrical contact between said one and said another of said contact members.

References Cited
UNITED STATES PATENTS

| | | | |
|---|---|---|---|
| 2,245,020 | 6/1941 | Thompson | 200—61.11 |
| 2,952,208 | 9/1960 | Wagoner | 102—70.2 |

ROBERT K. SCHAEFER, Primary Examiner

M. GINSBURG, Assistant Examiner

U.S. Cl. X.R.

102—70.2